Patented Apr. 5, 1949

2,466,429

UNITED STATES PATENT OFFICE 2,466,429

PREPARATION OF HYDROCARBON SUBSTITUTED HALOGENOSILANES

Dallas T. Hurd, Schenectady, N. Y., assignor to General Electric Company, a corporation of New York No Drawing. Application March 18, 1946, Serial No. 655,365

7 Claims. (Cl. 260—448.2)

The present invention relates to the preparation of organohalogenosilanes. It is particularly concerned with a method for the preparation of hydrocarbon-substituted halogenosilanes which comprises effecting reaction at an elevated temperature between silicon and a hydrocarbon halide in the presence of a halogen.

In Rochow U. S. Patent 2,380,995, issued August 7, 1945, and assigned to the same assignee as the present invention, is disclosed and broadly claimed the method of preparing organohalogenosilanes, more particularly hydrocarbon-substituted halogenosilanes, which comprises bringing a hydrocarbon halide into contact with heated silicon.

The present invention is based on my discovery that if the hydrocarbon halide is brought into contact with the heated silicon in the presence of, i. e., mixed with, a halogen, for example chlorine, bromine, fluorine, etc., and the reaction between the silicon and the hydrocarbon halide component of the gaseous mixture otherwise allowed to proceed in accordance with the teachings of the above-mentioned Rochow patent, certain unexpected and desirable results are obtained.

The use of the halogen in the above-described manner permits better control of the reaction and, in general, at a given temperature, results in increased yields of hydrocarbon-substituted halogenosilanes over those obtained when reaction is effected between the silicon and the hydrocarbon halide in the absence of the halogen. This desirable result is usually accompanied by no increase in the amount of low-boiling reaction products, such as the chlorosilanes, e. g., $SiHCl_3$ and $SiCl_4$, etc.

The halogen, such as chlorine, may be mixed with a hydrocarbon halide which is in the vapor state or it may be passed over, or bubbled through, a reservoir of a liquid hydrocarbon halide held at any desired temperature. With many of the hydrocarbon halides, this latter method, in which the halogen may also function as a carrier for the reactive hydrocarbon halide vapor, is preferred since the rate of flow of the gaseous mixture through the apparatus can be controlled by regulating the rate of flow of the halogen into the reservoir while the amount of the reactive hydrocarbon halide carried into contact with the heated silicon by the halogen can be controlled by varying the temperature of the hydrocarbon halide reservoir, i. e., the vapor pressure of the hydrocarbon halide. Although the halogen may be mixed with the hydrocarbon halide reactant in all proportions, best results are obtained when the halogen comprises from 5 to 35%, by volume, of the total gaseous mixture of the halogen and the hydrocarbon halide.

In order that those skilled in the art may better understand how the present invention may be practiced, the following examples are given by way of illustration and not by way of limitation.

Example 1

A Pyrex reaction tube was filled with powdered silicon (80 mesh). The tube was heated to a temperature of from 350–370° C. and a mixture of methyl chloride and chlorine, both in the gaseous state, were passed through the tube for three hours at a rate of about 75 cc. per minute of the former and 25 cc. of the latter. The effluent reaction products were passed through a trap cooled by a mixture of dry ice and acetone. The unreacted methyl chloride and other highly volatile products boiling at temperatures below 25° C. were removed from the condensate by distillation and the remaining liquid was fractionally distilled to give a mixture having a boiling point range of about 55–70° C. within which are found trimethylchlorosilane, dimethyldichlorosilane and methyltrichlorosilane. This mixture of methylchlorosilanes was then hydroylzed in ice and ether, the ether layer separated, and the ether evaporated to obtain a clear, transparent, methyl-substituted polysiloxane resin (methyl silicone resin).

Example 2

Using the same apparatus, silicon contact mass and temperatures as were employed in Example 1, methyl chloride was passed over the heated silicon for about 20 hours at a rate of about 75 cc. per minute. The condensate, after removal of unreacted methyl chloride and other highly volatile products, yielded a fraction corresponding to the boiling point range of a mixture consisting of trimethylchlorosilane, dimethyldichlorosilane and methyltrichlorosilane (boiling point range is approximately 55–70° C.). This mixture was hydrolyzed with ice and ether as in Example 1 to yield an amount of a clear, transparent, methyl-substituted polysiloxane resin which was less than the amount of resin obtained in Example 1.

An analysis of the resins obtained in Examples 1 and 2 gave the following results:

|  | Hydrogen | Silicon | Carbon |
|---|---|---|---|
|  | Percent | Percent | Percent |
| Resin from Example 1 | 4.28 | 38.34 | 17.26 |
| Resin from Example 2 | 4.49 | 39.95 | 16.46 |

The above analysis shows that in each case substantially the same resin was obtained. However, the use of chlorine, in the case of Example 1, resulted in a greater yield in approximately one-seventh the time required in Example 2 where the chlorine was omitted.

The reason for this surprising increase in the reaction velocity obtained by the utilization of the halogen, specifically chlorine, is not clearly understood. It may be due to a dynamic relationship between the halogen and the silicon atoms to effect an activation of the silicon. The activated silicon is, apparently, better able to effect dissociation of the hydrocarbon halide molecule.

It is, of course, understood that my invention is not limited to reactions involving the specific hydrocarbon halide named in the above illustrative examples. Examples of hydrocarbon halides other than methyl chloride which may be reacted with silicon at an elevated temperature in the presence of a halogen with comparable results are the higher alkyl halides, e. g., ethyl chloride, ethyl bromide, propyl chloride, etc.; the aryl halides, e. g., phenyl chloride, and the hydrocarbon dihalides such as methylene chloride, ethylene bromide, dichlorobenzene, etc.

The reaction may also be carried out in the presence of metallic catalysts for the reaction between the hydrocarbon halide and the silicon, e. g., copper, nickel, tin, antimony, manganese, silver, titanium, etc. Additional information concerning the use of these catalysts will be found in the aforementioned Rochow U. S. Patent 2,380,995.

The preferred reaction temperatures, i. e., the temperatures at which substantial yields of the hydrocarbon-substituted halogenosilanes are obtained depend, in general, on the reactant or reactants, the reaction conditions, type of reactor, etc. The preferable range is from about 200° to 500° C.; optimum results usually are obtained within the more limited range of 250° to 400° C.

Although chlorine has been used in the above examples, it is to be understood that other halogens, e. g., bromine, fluorine, etc., may be substituted for the chlorine used in the foregoing illustrative examples. Chlorine, for economical reasons and because of its availability, is preferred.

What I claim as new and desire to secure by Letters Patent of the United States is:

1. The method for increasing the rate of reaction between a hydrocarbon halide and silicon at an elevated temperature thereby to produce a mixture of hydrocarbon-substituted halogenosilanes, which method comprises simultaneously passing a mixture of a preformed halogen and the hydrocarbon halide over the heated silicon.

2. The method for increasing the rate of reaction between heated silicon and a gaseous hydrocarbon halide thereby to produce a mixture of hydrocarbon-substituted halogenosilanes, which method comprises mixing from 5 to 35 per cent, by volume, of a halogen, based on the total volume of the halogen and hydrocarbon halide, with the hydrocarbon halide before the latter is brought into contact with the silicon.

3. The method for increasing the rate of reaction between silicon and an alkyl halide at an elevated temperature thereby to produce a mixture of alkylhalogenosilanes, which method comprises mixing chlorine with the alkyl halide before the latter is brought into contact with the silicon.

4. The method for increasing the rate of reaction between heated silicon and methyl chloride thereby to produce a mixture of methylchlorosilanes, which method comprises mixing a halogen with the methyl chloride before the latter is brought into contact with the heated silicon.

5. The method of increasing the rate of production of methylchlorosilanes resulting from the reaction of methyl chloride with heated silicon, which method comprises mixing about from 5 to 35% chlorine, by volume, based on the total volume of the chlorine and methyl chloride, with the methyl chloride before the methyl chloride is brought into contact with the silicon.

6. The method for increasing the rate of reaction between silicon and a hydrocarbon halide at an elevated temperature in the presence of a metallic catalyst for the reaction between these two components thereby to produce a mixture of hydrocarbon-substituted halogenosilanes, which method comprises mixing a halogen with the hydrocarbon halide before the latter is brought into contact with the heated silicon.

7. The method for accelerating the rate of production of methylchlorosilanes, which method comprises passing a gaseous mixture of methyl chloride and chlorine over a heated mass comprising silicon intimately associated with copper, thereby to effect reaction between the methyl chloride and the silicon component of the said mass, and recovering the methylchlorosilanes.

DALLAS T. HURD.

REFERENCES CITED

The following references are of record in the file of this patent:

UNITED STATES PATENTS

| Number | Name | Date |
|---|---|---|
| 2,380,995 | Rochow I | Aug. 7, 1945 |
| 2,380,996 | Rochow | Aug. 7, 1945 |
| 2,380,997 | Patnode | Aug. 7, 1945 |
| 2,380,998 | Sprung | Aug. 7, 1945 |
| 2,380,999 | Sprung | Aug. 7, 1945 |
| 2,381,000 | Patnode | Aug. 7, 1945 |
| 2,381,001 | Patnode | Aug. 7, 1945 |
| 2,381,002 | Patnode | Aug. 7, 1945 |
| 2,383,818 | Patnode | Aug. 28, 1945 |
| 2,389,931 | Reed et al. | Nov. 27, 1945 |

OTHER REFERENCES

Hurd et al., "Jour. Amer. Chem. Soc.," vol. 67 (1945), pages 1057–59.

Rochow II, Jour. Amer. Chem. Soc., vol. 67 (1945), page 1772.